United States Patent [19]

Reinsma et al.

[11] 3,832,022

[45] Aug. 27, 1974

[54] DUAL SEAL ARRANGEMENT FOR A SPHERICAL JOINT

[75] Inventors: Harold L. Reinsma, Dunlap; Lowell P. Iverson, Aurora, both of Ill.

[73] Assignee: Caterpillar Tractor Co., Peoria, Ill.

[22] Filed: Apr. 30, 1973

[21] Appl. No.: 355,476

[52] U.S. Cl. ............................................. 308/36.1
[51] Int. Cl. ........................................ F16c 33/72
[58] Field of Search .................... 308/36.1, 36.2, 72

[56] References Cited
UNITED STATES PATENTS
3,666,332    5/1972    Kampest et al. .................. 308/135

*Primary Examiner*—Charles J. Myhre
*Assistant Examiner*—Frank Susko
*Attorney, Agent, or Firm*—Phillips, Moore, Weissenberger, Lempio & Strabala

[57] ABSTRACT

A joint includes a ball associated with a shaft and a socket body disposed thereabout. Retainer means are disposed about the shaft and define a pair of retainer surfaces spaced apart from the socket body. First annular seal means are disposed between one retainer surface and one side of the socket body, and second annular seal means are disposed between the other retainer surface and the other side of the socket body. The seal means are bonded to the respective retainer surfaces, and are in slidable sealing relation with the socket body to allow full 360° rotation of the socket body about the longitudinal axis of the shaft. The seal means also allow a degree of rotation of the socket body about axes of rotation perpendicular to the longitudinal axis of the shaft. The shaft may be associated with the retainer means so as to be relatively freely removable therefrom.

28 Claims, 5 Drawing Figures

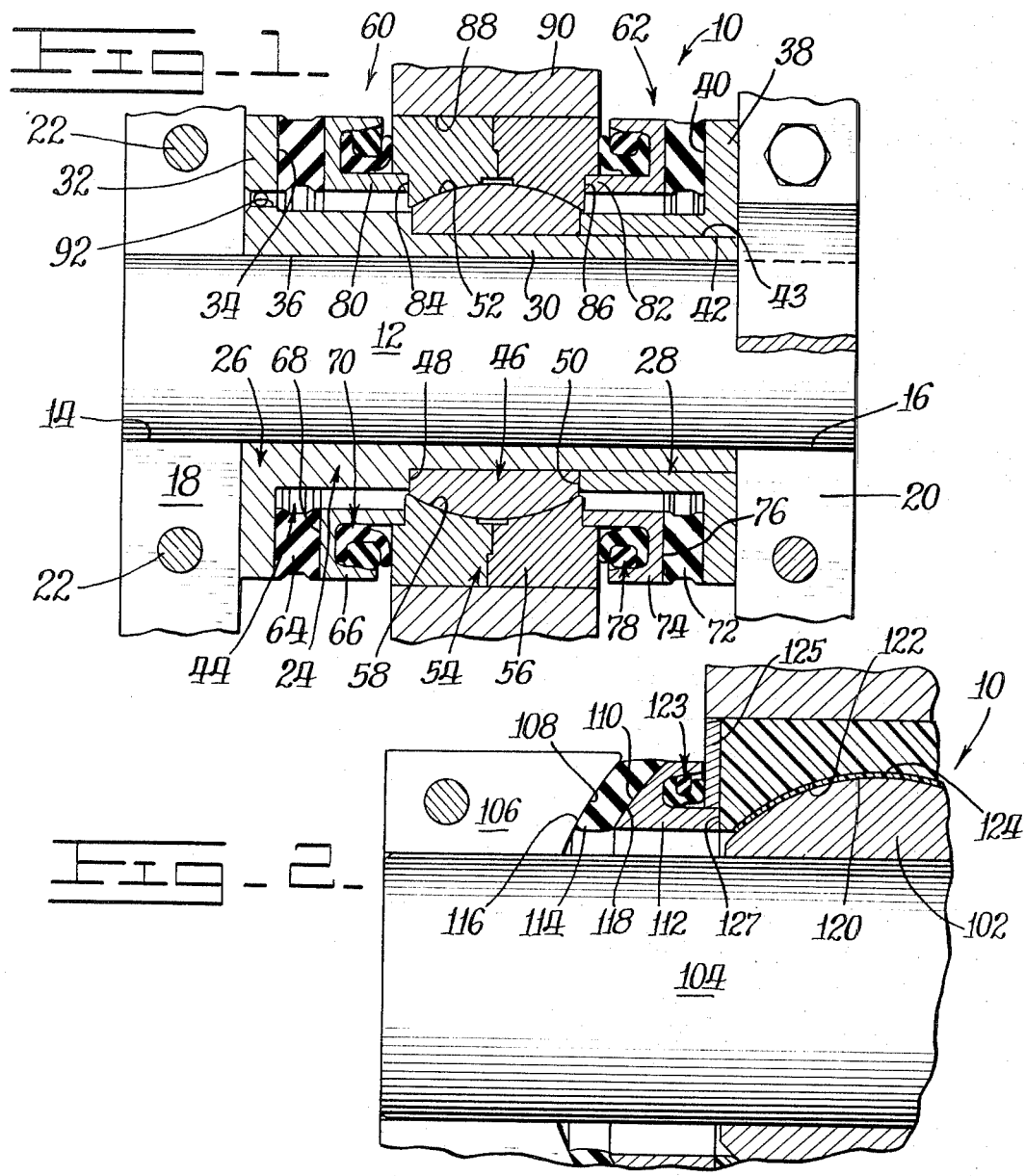
Fig-1-
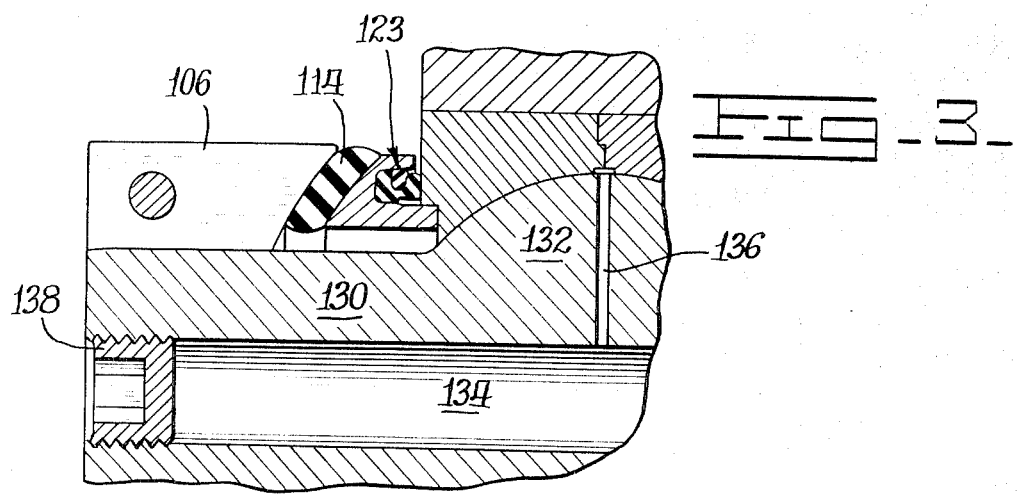
Fig-2-
Fig-3-

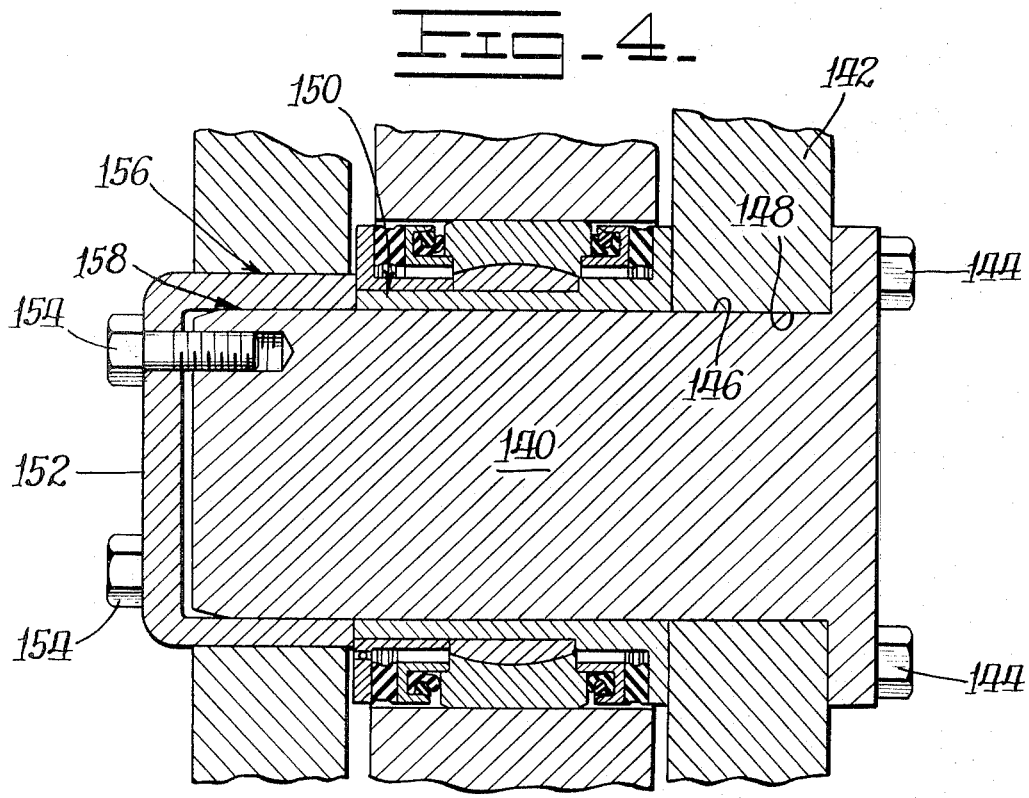
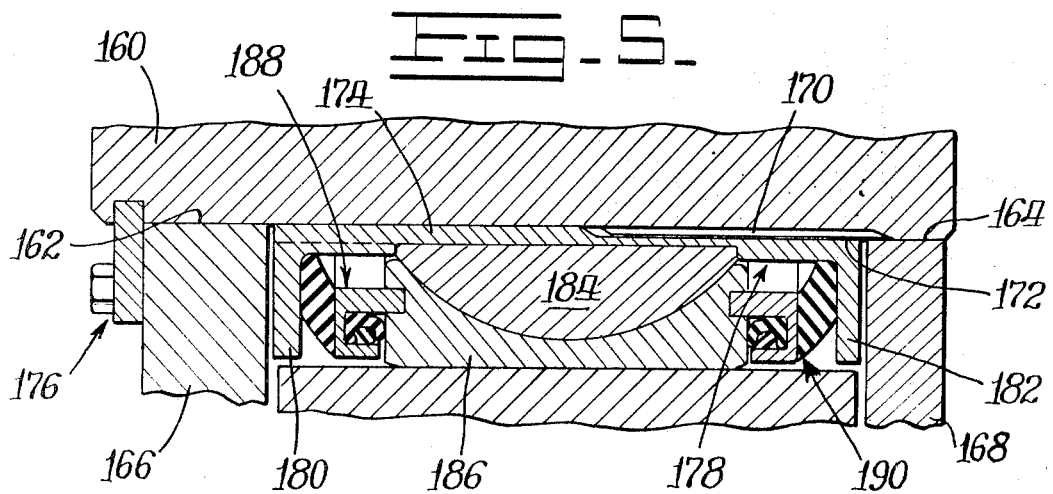

DUAL SEAL ARRANGEMENT FOR A SPHERICAL JOINT

BACKGROUND OF THE INVENTION

This invention relates to ball and socket joints, and more particularly, to a ball and socket joint which allows full 360° rotation thereof, and a degree of transverse angular motion.

Positive sealing of ball and socket joints subjected to both rotation and transverse angular motion has long been a problem. For the most part, industry uses face or lip type seals which engage the outer periphery of the ball or socket surface and which run over a sealing zone alternately exposed to the internal chamber and the exterior surface open to the atmosphere. (See, for example, U.S. Pat. No. 3,506,315 to Young.) With rotation and transverse oscillation of the joints, such seals do not traverse over a relatively narrow band, but must follow an orbital path, at times attempting to seal on spherical surfaces that have been covered with abrasive contaminants. Often times, the exterior surface of such a joint deteriorates with age and service, and sustained positive sealing on such surfaces is presently extremely difficult to attain.

Another problem with such joints is that many have included a large number of parts which must be installed sequentially at the installation site, thus presenting the problem of contaminants being allowed into the sensitive bearing surfaces during such assembly. (See, for example, U.S. Pat. No. 3,620,578 to Fix.)

Another requirement that must be met for spherical bearings in certain applications is the ability to rotate unlimitedly (360° rotative sealing).

Of more general interest in this area are U.S. Pat. No. 2,308,613 to Le Tourneau, U.S. Pat. No. 3,680,924 to Otto et al. and U.S. Pt. No. 3,666,332 to Kampert et al.

SUMMARY OF THE INVENTION

It is an object of this invention to overcome the problems of the prior art devices by providing a joint in which positive sealing is provided, meanwhile allowing full 360° rotation within the joint, and also a degree of transverse rotation within the joint.

It is a still further object of this invention to provide a joint which, while fulfilling the above object, may be assembled to an extent in a controlled environment, to control the problem of contaminants getting into the sensitive bearing surfaces.

It is a still further object of this invention to provide a joint which, while fulfilling the above objects, is relatively simple in design, relatively easy to assemble, and extremely efficient in use.

Broadly stated, the invention comprises a joint comprising a shaft having oppositely extending ends. Retainer means are disposed about the shaft and define first and second continuous annular retainer surfaces facing toward each other and in spaced relation to each other. Means interconnect the retainer surfaces to maintain such retainer spacing and to define with said retainer surfaces a continuous annular channel about the shaft. Means are provided for preventing rotation of the shaft relative to the retainer means about the longitudinal axis of the shaft. Ball means are fixed relative to the means interconnecting the retainer surfaces and define a substantially spherical convex surface portion. Socket means comprising a socket body define a substantially spherical concave surface portion adjacent the substantially spherical convex surface portion of the ball member. First annular seal means are disposed between the socket body and the first retainer surface and are in continuous annular contact with the socket body and first retainer surface. Second annular seal means are disposed between the socket body and the second retainer surface and are in continuous annular contact with the socket body and the second retainer surface. Pivoting of the socket body portion about the ball means is allowed about the longitudinal axis of the shaft with the first annular seal means being in sliding relation with at least one of the first retainer surface and socket body and the second annular seal means being in sliding relation with at least one of the second retainer surface and the socket body, to allow such pivoting.

BRIEF DESCRIPTION OF THE DRAWINGS

These and other objects of the invention will become apparent from a study of the following specification and drawings, in which:

FIG. 1 is a sectional elevation of a first embodiment of the inventive joint;

FIG. 2 is a sectional elevation of a second embodiment of joint;

FIG. 3 is a sectional elevation of a third embodiment of joint;

FIG. 4 is a sectional view of a fourth embodiment of joint; and,

FIG. 5 is a sectional view of a fifth embodiment of joint.

DESCRIPTION OF THE PREFERRED EMBODIMENT

Shown generally in FIG. 1 is a first embodiment of joint 10. Such joint 10 includes a cylindrical shaft 12 having oppositely extending ends. The ends of the shaft 12 are shown mounted in bores 14,16 defined by walls 18,20 disposed on either side of the joint 10. The walls 18,20 are split along diameters of the bores 14,16, the parts thereof being held together by bolts 22. Disposed about the shaft 12 are retainer means 24, made up of a first retainer portion 26 and a second retainer portion 28. Retainer portion 26 includes a tubular portion 30 disposed about the shaft 12, and an outwardly extending portion 32 which defines a continuous annular retainer surface 34. The inner bore 36 of the tubular portion 30 is a slight interference fit with the shaft 12, so as to fit reasonably tightly thereon.

The second retainer portion 28 defines an outwardly extending portion 38 which also defines a continuous annular retainer surface 40. These retainer surfaces 34,40 face toward each other, and are in spaced relation to each other, and are maintained in such spacing by the fact that the inner bore 42 of the retainer portion 28 is a slight interference fit with the outer surface 43 of the tubular portion 30. Such retainer surfaces 34,40 and tubular portion 30 together define a continuous annular channel 44 about the shaft 12. Because of the interference fits between shaft 12 and tubular portion 30, and between tubular portion 30 and retainer portion 28, the retainer means 24 are prevented from rotation relative to the shaft 12.

In this embodiment, retainer surfaces 34,40 are substantially perpendicular to the longitudinal axis of the shaft 12.

Ball means 46 are fixed about and relative to the tubular portion 30 by means of shoulders 48,50 defined by the tubular portion 30 and retainer portion 28, and between which such ball means 46 are held. Such ball means define a substantially spherical convex surface portion 52.

Socket means 54 comprising a socket body 56 are disposed about the ball means 46, and define a substantially spherical concave surface portion 58 adjacent the surface portion 52 of the ball means 46.

Annular seal means 60,62 are disposed between the socket body 56 and the retainer surface 34, and the socket body 56 and retainer surface 40 respectively. Annular seal means 60 are made up of an annular resilient member 64 which is in continuous annular contact with the retainer surface 34 and bonded thereto, an annular seal carrier 66 having a surface 68 substantially perpendicular to the longitudinal axis of the shaft 12 and in continuous annular contact with the annular resilient member 64 and bonded thereto, and an annular resilient member 70 carried by the seal carrier 66 and in continuous annular contact with the seal carrier 66, and also in continuous annular sliding contact with the socket body 56.

Similarly, the annular seal means 62 are made up of an annular resilient member 72 in continuous annular contact with the retainer surface 40 and bonded thereto, an annular seal carrier 74 having a surface 76 substantially perpendicular to the longitudinal axis of the shaft 12 and in continuous contact with the annular resilient member 72 and bonded thereto, and an annular resilient member 78 carried by the seal carrier 74 and in continuous annular contact with the seal carrier 74, and also in continuous annular sliding contact with the socket body 56. Thus, the socket body 56, when rotated or pivoted about the longitudinal axis of the shaft 12, rotates relative to the annular resilient members 64,70,72,78 and the seal carriers 66,74.

The seal carriers 66,74 define annular ribs 80,82 respectively, which are disposed toward each other. The ribs 80,82 are positioned in annular stepped portions 84,86 defined by the socket body 56 for sliding and gliding contact therewith as the socket body 56 rotates about the longitudinal axis of the shaft 12 relative to the seal carriers 66,74.

Such ribs 80,82 and stepped portions 84,86 position the seal carriers 66,74 (and hence the resilient members 70,78). Thus, the resilient members 70,78 are kept in intimate contact with the socket body 56 in a continuous, circular manner, despite transverse rotation or oscillation of the socket body 56 about any axis perpendicular to the longitudinal axis of the shaft 12, even with simultaneous rotation of the socket body 56 more or less about the longitudinal axis of the shaft 12.

The parts described are sized and positioned so that the annular resilient members 64,72 are each in a compressed state, in fact, sufficiently compressed to allow 20° of movement of the socket body 56 about any axis of rotation from a centered state (i.e., that state when the socket body 56 is positioned only by the compressive forces of the annular resilient members 64,72) without completely releasing compressive force on either of the annular resilient members 64,72 (i.e., without placing either annular resilient member 64,72 in tension).

The joint 10 is pre-assembled in the following manner. The annular seal means 60 are positioned about tubular portion 30, with the surfaces being bonded as described above. The socket body 56 made up of split halves as shown, is assembled on the ball means 46 as shown, and the halves are fixed together. The ball means 46 and socket body 56 are then urged leftwardly until the rib 80 engages the stepped portion 84, and the annular resilient member 64 is compressed until the ball means 46 abut the shoulder 48. The similar seal means 62 are then moved leftward about the tubular portion 30, and retainer portion 28 is pressed leftward on the tubular portion 30 until shoulder 50 is in contact with ball means 46 (the proper surfaces being bonded together, of course, as described above), which compresses annular member 72 to the extent necessary. This entire assembly may be pressed onto shaft 12, and the socket body 56 may be pressed into the bore 88 of a central arm 90. The joint may then be fitted to the walls 18 and 20.

The retainer portion 26 defines passage means 92 for allowing introduction of lubricating fluid therethrough to the surfaces 52,53.

A dry form of sealed cartridge joint 100 is shown in FIG. 2. In such embodiment, the ball means 102 are a press fit on the shaft 104, as are the retainer portions (one shown at 106), and the retainer surfaces (one shown at 108) are generated substantially about the center of the ball means 102. Also, the surfaces 110 of the seal carriers (one shown at 112) are generated substantially about the center of the ball means 102. The annular resilient member 114 defines surfaces 116,118, also generated substantially about the center of the ball means 102, and which are bonded to the surfaces 108 and 110 respectively. (A similar annular resilient member is shaped likewise and associated similarly with the seal carrier and retainer surface on the other side of the ball means 102.)

The annular resilient members (one shown at 114) are in a compressed state, as previously described. The particular shaping of those surfaces generated about the center of the ball means 102 results in the fact that upon pivoting of the socket body about any axis of rotation perpendicular to the longitudinal axis of the shaft 104, the compressive force on each annular resilient member between the bonded surfaces thereof is not increased.

In this embodiment, the shaft 104 acts to interconnect the retainer means, the retainer means being press-fitted over the shaft 104 to prevent rotation of the shaft 104 relative to the retainer means about the longitudinal axis of the shaft 104.

The subject joint requires no lubrication because in this embodiment a resin-impregnated fibrous bearing liner 120 is fixed to the substantially concave surface portion 122 in facing relation to the substantially convex surface portion 124 of the ball means 102, and between the surfaces 122,124. These moldably formed bearing liners include various cloth and/or filament arrangements disposed therein so that no lubrication is required because of the liners' self-lubricating properties.

In this embodiment, the socket means are of reinforced plastic material. The resilient members (one shown at 123) carried by the seal carriers are actually in sliding engagement with a metal washer 125 which makes up part of the socket means. The socket means define stepped portions (one shown at 127) as described in the previous embodiment. The bearing liner 120 extends as shown to provide lubrication in these areas in relation to the ribs which are disposed therein.

In FIG. 3, the shaft 130 includes ball means 132 formed as an integral part thereof. The shaft 130 further defines a central longitudinal passage 134 and a plurality of centrally disposed radial passages 136 for allowing introduction of lubricating fluid therethrough to the ball and socket surfaces. A plug 138 is removably secured in the end of the passage 134 for the purpose of adding lubricant within the joint.

Under some conditions, it is difficult to field service the cartridge joints, and more particularly, difficult to remove a shaft thereof which is pressed into apertures in the retainer means. The construction of FIG. 4 solves this problem by providing a flanged shaft 140 which is removably secured to a wall 142 by a plurality of retaining bolts 144. An external cylindrical surface 146 of the shaft 140 is disposed as a freely slidable fit in a bore 148 in the wall 142. The retainer means 150 are in slightly tight press-fit relation with the central portion of the flanged shaft 140. An end cap 152 embraces the extremity of the shaft 140 and is biasedly engaged with the retainer means 150 of the joint by a plurality of bolts 154 threadably engaged in the shaft 140. Such a construction ensures that relative motion will occur between the adjacent bearing surfaces of the ball and socket. The diametrical clearances at adjacent cylindrical surfaces 156 and 158 are relatively loose to allow more convenient and easy field servicing of the joints. It is to be noted that the field cartridge of this embodiment can be easily installed in the field without the danger of contamination by dirt.

In FIG. 5, another easily removable shaft 160 is provided with the joint. The shaft 160 is a freely slidable fit within the bores 162,164 defined by walls 166,168. The shaft 160 defines splines 170 in engagement with splines 172 defined by the inner surface of the tubular portion 174, so that the shaft 160 is a freely slidable fit within the tubular portion 174, but is prevented from rotation relative thereto by the engagement of splines 170,172. The shaft 160 is suitably removably secured to the wall 166 by a lock arrangement generally shown at 176. The retainer means 178 in this embodiment are assembled by welding a retainer portion 180 to a retainer portion 182 (which includes tubular portion 174), after the ball means 184, socket body 186, and annular seal means 188,190 have been positioned about the tubular portion 174.

What is claimed is:

1. A joint comprising:
   a shaft having oppositely extending ends;
   retainer means disposed about the shaft and defining first and second continuous annular retainer surfaces facing toward each other and in spaced relation to each other;
   means interconnecting the retainer surfaces to maintain such retainer surface spacing and to define with said retainer surfaces a continuous annular channel about the shaft;
   means for preventing rotation of the shaft relative to the retainer means about the longitudinal axis of the shaft;
   ball means fixed relative to the means interconnecting the retainer surfaces and defining a substantially spherical convex surface portion;
   socket means comprising a socket body defining a substantially spherical concave surface portion adjacent the substantially spherical convex surface portion of the ball means;
   first annular seal means disposed between the socket body and the first retainer surface and in continuous annular contact with the socket body and first retainer surface;
   second annular seal means disposed between the socket body and the second retainer surface and in continuous annular contact with the socket body and the second retainer surface;
   so that pivoting of the socket body about the ball means is allowed about the longitudinal axis of the shaft with the first annular seal means being in sliding relation with at least one of the first retainer surface and socket body and the second annular seal means being in sliding relation with at least one of the second retainer surface and the socket body, to allow such pivoting.

2. The joint of claim 1 wherein the first annular seal means comprise a first annular resilient member in continuous annular contact with the first retainer surface, a first annular seal carrier in continuous annular contact with the first annular resilient member, and a second annular resilient member carried by the first annular seal carrier and in continuous annular contact with the first annular seal carrier, and in continuous annular sliding contact with the socket body, and wherein the second annular seal means comprise a third annular resilient member in continuous annular contact with the second retainer surface, a second annular seal carrier in continuous annular contact with the third annular resilient member, and a fourth annular resilient member carried by the second annular seal carrier and in continuous annular contact with the second annular seal carrier and in continuous annular sliding contact with the socket body.

3. The joint of claim 2 wherein the first annular resilient member is bonded to the first retainer surface, and the first annular seal carrier is bonded to the first annular resilient member, and wherein the third annular resilient member is bonded to the second retainer surface, and the second annular seal carrier is bonded to the third annular resilient member, so that the socket body, when rotated about the longitudinal axis of the shaft, rotates relative to the first, second, third and fourth annular resilient members and the first and second seal carriers.

4. The joint of claim 3 wherein the first and second annular seal carriers define respectively first and second annular ribs disposed toward each other and positioned in first and second annular stepped portions defined by the socket body for sliding and guiding contact therewith as the socket body rotates relative to the first and second annular seal carriers.

5. The joint of claim 2 wherein the first annular resilient member is in a compressed state between the first retainer surface and the first seal carrier, and the third annular resilient member is in a compressed state between the second retainer surface and the second seal carrier.

6. The joint of claim 5 wherein the first and third annular resilient members are sufficiently compressed to allow 20° of movement in either direction from a centered state of the socket body about any axis of rotation substantially perpendicular to the longitudinal axis of the shaft without completely releasing compressive force on either the first and third annular resilient members.

7. The joint of claim 6 wherein the first annular resilient member is bonded to the first retainer surface, and the first annular seal carrier is bonded to the first annular resilient member, and wherein the third annular resilient member is bonded to the second retainer surface, and the second annular seal carrier is bonded to the third annular resilient member, so that the socket body, when rotated about the longitudinal axis of the shaft, rotates relative to the first, second, third and fourth annular resilient members and first and second seal carriers.

8. The joint of claim 2 wherein the first and second retainer surfaces are substantially perpendicular to the longitudinal axis of the shaft, against which surfaces the first and third annular resilient members are in continuous annular contact respectively, and the first and second seal carriers define surfaces substantially perpendicular to the longitudinal axis of the shaft and against which the first and third annular resilient members are in continuous annular contact respectively.

9. The joint of claim 8 wherein the first annular resilient member is bonded to the first retainer surface, and the first annular seal carrier is bonded to the first annular resilient member, and wherein the third annular resilient member is bonded to the second retainer surface, and the second annular seal carrier is bonded to the third annular resilient member, so that the socket body, upon rotation about the longitudinal axis of the shaft, rotates relative to the first, second, third and fourth annular resilient members and first and second seal carriers.

10. The joint of claim 9 wherein the first annular resilient member is in a compressed state between the first retainer surface and the first seal carrier, and the third annular resilient member is in a compressed state between the second retainer surface and the second seal carrier.

11. The joint of claim 10 wherein the first and second annular seal carriers define respectively first and second annular ribs disposed toward each other and positioned in first and second annular step portions defined by the socket body, for sliding and guiding contact therewith as the socket body rotates relative to the first and second annular seal carriers.

12. The joint of claim 2 wherein the first and second retainer surfaces are generated substantially about the center of the ball means, against which retainer surfaces the first and third annular resilient members are in continuous contact respectively, and the first and second seal carriers define surfaces generated substantially about the center of the ball means, and against which the first and third annular resilient members are in continuous annular contact respectively.

13. The joint of claim 12 wherein the first annular resilient member is bonded to the first retainer surface, and the first annular seal carrier is bonded to the first annular resilient member, and wherein the third annular resilient member is bonded to the second retainer surface, and the second annular seal carrier is bonded to the third annular resilient member, so that the socket body, upon rotation about the longitudinal axis of the shaft, rotates relative to the first, second, third and fourth annular resilient members and first and second seal carriers.

14. The joint of claim 13 wherein the first annular resilient member is in a compressed state between the first retainer surface and the first seal carrier, and the third annular resilient member is in a compressed state between the second retainer surface and the second seal carrier.

15. The joint of claim 14 wherein the first and second annular seal carriers define respectively first and second annular ribs disposed toward each other and positioned in first and second annular step portions defined by the socket body, for sliding and guiding contact therewith as the socket body rotates relative to the first and second annular seal carriers.

16. The joint of claim 2 wherein the means interconnecting the retainer means comprise the shaft, the retainer means being fixed relative to the shaft to prevent rotation of the shaft relative to the retainer means about the longitudinal axis of the shaft.

17. The joint of claim 2 wherein the means interconnecting the retainer means comprise tubular means disposed about the shaft, the first and second retainer surfaces being fixed relative thereto.

18. The joint of claim 17 and further comprising first and second walls on either side of the retainer means and defining first and second bores in which said shaft is a freely slidable fit, and means for removably securing the shaft relative to one of the walls.

19. The joint of claim 18 wherein the shaft is a freely slidable fit within the tubular means longitudinally thereof.

20. The joint of claim 19 wherein the means for preventing rotation of the shaft relative to the retainer means comprise spline means defined by the shaft and in engagement with spline means defined by the inner surface of the tubular means.

21. The joint of claim 2 wherein the shaft and ball means define passage means for allowing introduction of lubricating fluid therethrough to the ball and socket surfaces.

22. The joint of claim 2 wherein the retainer means define passage means for allowing introduction of lubricating fluid therethrough to the ball and socket surfaces.

23. The joint of claim 2 and further comprising a liner fixed to the substantially spherical concave surface portion defined by the socket body, and disposed between said substantially spherical concave surface portion and the substantially spherical convex surface portion of the ball means.

24. A joint comprising:
a shaft having oppositely extending ends;
retainer means disposed about the shaft and defining a continuous annular retainer surface;
means for maintaining the position of said retainer surface relative to said shaft along the longitudinal axis thereof and for preventing rotation of the shaft relative to the retainer means about the longitudinal axis of the shaft;
ball means fixed relative to the shaft and defining a substantially convex surface portion;
socket means comprising a socket body defining a substantially spherical concave surface portion adjacent the substantially spherical convex surface portion of the ball means;

annular seal means disposed between the socket body and the retainer surface and in continuous annular contact with the socket body and first retainer surface;

said annular seal means comprising a first annular resilient member in continuous annular contact with the first retainer surface, an annular seal carrier in continuous annular contact with the first annular resilient member, and a second annular resilient member carried by the annular seal carrier and in continuous annular contact with the annular seal carrier, with at least one of the first and second annular resilient members being in continuous annular sliding relation with the retainer surface and socket body respectively, so that pivoting of the socket body about the ball means is allowed about the longitudinal axis of the shaft.

25. The joint of claim 24 wherein the second annular resilient member is in continuous annular sliding contact with the socket body.

26. The joint of claim 25 wherein the first annular resilient member is bonded to the retainer surface, and the annular seal carrier is bonded to the first annular resilient member, so that the socket body, when rotated about the longitudinal axis of the shaft, rotates relative to the first and second annular resilient members and the seal carrier.

27. The joint of claim 26 wherein the annular seal carrier defines an annular rib disposed toward the socket body and positioned in an annular stepped portion defined by the socket body for sliding and guiding contact therewith as the socket body rotates relative to the annular seal carrier.

28. The joint of claim 27 wherein the first annular resilient member is in a compressed state between the retainer surface and the seal carrier.

* * * * *